United States Patent
Calcagno et al.

(10) Patent No.: US 9,201,758 B2
(45) Date of Patent: Dec. 1, 2015

(54) SYSTEM AND METHOD FOR DISPLAY OF SOFTWARE QUALITY

(71) Applicant: Facebook, Inc., Menlo Park, CA (US)

(72) Inventors: Cristiano Calcagno, Zurich (CH); Dino S. Distefano, London (GB)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/183,147

(22) Filed: Feb. 18, 2014

(65) Prior Publication Data

US 2014/0165045 A1   Jun. 12, 2014

Related U.S. Application Data

(63) Continuation of application No. 13/451,417, filed on Apr. 19, 2012, now abandoned.

(60) Provisional application No. 61/477,009, filed on Apr. 19, 2011.

(51) Int. Cl.
  *G06F 9/44* (2006.01)
  *G06F 11/36* (2006.01)

(52) U.S. Cl.
  CPC .............. *G06F 11/3616* (2013.01); *G06F 8/77* (2013.01)

(58) Field of Classification Search
  CPC ............ G06F 11/3616; G06F 11/3604; G06F 11/3636; G06F 11/323; G06F 11/3612; G06F 8/77; G06F 11/36
  USPC .......................................... 717/125, 127, 131
  See application file for complete search history.

(56) References Cited

U.S. PATENT DOCUMENTS

| | | | |
|---|---|---|---|
| 6,823,507 B1 * | 11/2004 | Srinivasan et al. | 717/152 |
| 6,959,431 B1 * | 10/2005 | Shiels et al. | 717/124 |
| 2006/0080364 A1 | 4/2006 | Lake | |
| 2006/0150160 A1 * | 7/2006 | Taft et al. | 717/126 |
| 2008/0092122 A1 * | 4/2008 | Caprihan et al. | 717/127 |
| 2008/0148225 A1 | 6/2008 | Sarkar et al. | |
| 2009/0070734 A1 | 3/2009 | Dixon et al. | |
| 2010/0198799 A1 * | 8/2010 | Krishnan et al. | 707/702 |
| 2010/0287538 A1 | 11/2010 | Soundararajan et al. | |
| 2010/0333069 A1 | 12/2010 | Chandra et al. | |
| 2011/0022551 A1 | 1/2011 | Dixon | |
| 2011/0055798 A1 | 3/2011 | Kraft et al. | |
| 2011/0078667 A1 | 3/2011 | Dolby et al. | |

OTHER PUBLICATIONS

Nagappan, "Static Analysis Tools as Early Indicators of Pre-Release Defect Density", May 2005, pp. 580-586.*
Co-Pending U.S. Appl. No. 13/451,417 of Calcagno, C., et al., filed Apr. 19, 2012.
Non-Final Office Action Mailed Jul. 17, 2013 in Co-Pending U.S. Appl. No. 13/451,417 of Calcagno, C., et al., filed Apr. 19, 2012.
Final Office Action Mailed Nov. 18, 2013 in Co-Pending U.S. Appl. No. 13/451,417 of Calcagno, C., et al., filed Apr. 19, 2012.
Joy, M., The BOSS Online Submission and Assessment System, Sep. 2005, ACM vol. 5, No. 3, pp. 1-28.

* cited by examiner

*Primary Examiner* — Duy Khuong Nguyen
(74) *Attorney, Agent, or Firm* — Perkins Coie LLP

(57) ABSTRACT

A method for code analysis comprising steps of inputting program code to an analyzer, assigning an objective quality measure to components of the analyzed code; and displaying graphically the objective quality measures.

20 Claims, 8 Drawing Sheets

… (1)

SYSTEM AND METHOD FOR DISPLAY OF SOFTWARE QUALITY

FIELD OF THE DISCLOSURE

The technical field of the present disclosure is related to computing systems and more particularly related to tools for development of software for computing systems.

BACKGROUND

Software has become a vital aspect of modern life and, as a consequence, its high-quality is a major concern. Software development is a distributed effort involving tens if not hundreds of developers and thousands of lines of code. The larger the software project, the greater the number of individuals adding, editing, and testing code. It is recognized that tools are needed in the software development and testing process to allow IT project managers to improve productivity, improve quality, reliability and reduce expenditure.

Typical software analysis tools provide the ability to independently analyze software code statically and dynamically. Static analysis can identify correctness issues in code without actually executing that code, through techniques such as data flow analysis, value tracking, and the like. Dynamic analysis can provide information pertaining to timing and how much memory is allocated, for example.

Yet, the tools available to quickly identify and prioritize quality issues within software projects have been limited. Major advances have been made by the scientific community in designing techniques which help developers to independently improve the quality of their software. However, an aspect for achieving software quality is the ability to measure not only an individual's software development but the overall software project. Despite many efforts, the goal of finding effective quantitative, objective quality measurements of software has remained elusive. Many important concepts in software quality assurance (SQA), although derived from good intuition and collective experience, do not lend themselves easily to measurement. Nevertheless, quantitative, objective measurements are needed, since they provide a concrete means to communicate, reproduce, analyze, and compare individual outcomes. Assessing or measuring software quality, particularly with respect to large scale software projects, has so far resisted meaningful or practical, processor executed algorithmic analysis.

SUMMARY

In accordance with a general aspect of the present matter there is provided a method for code analysis comprising steps of: inputting program code to an analyzer; assigning an objective quality measure to components of said analyzed code; and computing metrics for display of the objective quality measures.

In accordance with a further aspect the display may be a graphical display.

In accordance with a still further aspect the display may be an ordered list or table.

A further aspect of the present matter provides for a tool for processing results from a static code analysis module into a display of software quality to augment software development and testing process to improve productivity, quality and reliability of software.

BRIEF DESCRIPTION OF THE DRAWINGS

The present disclosure will be better understood with reference to the drawings in which.

DETAILED DESCRIPTION

Figure 1:
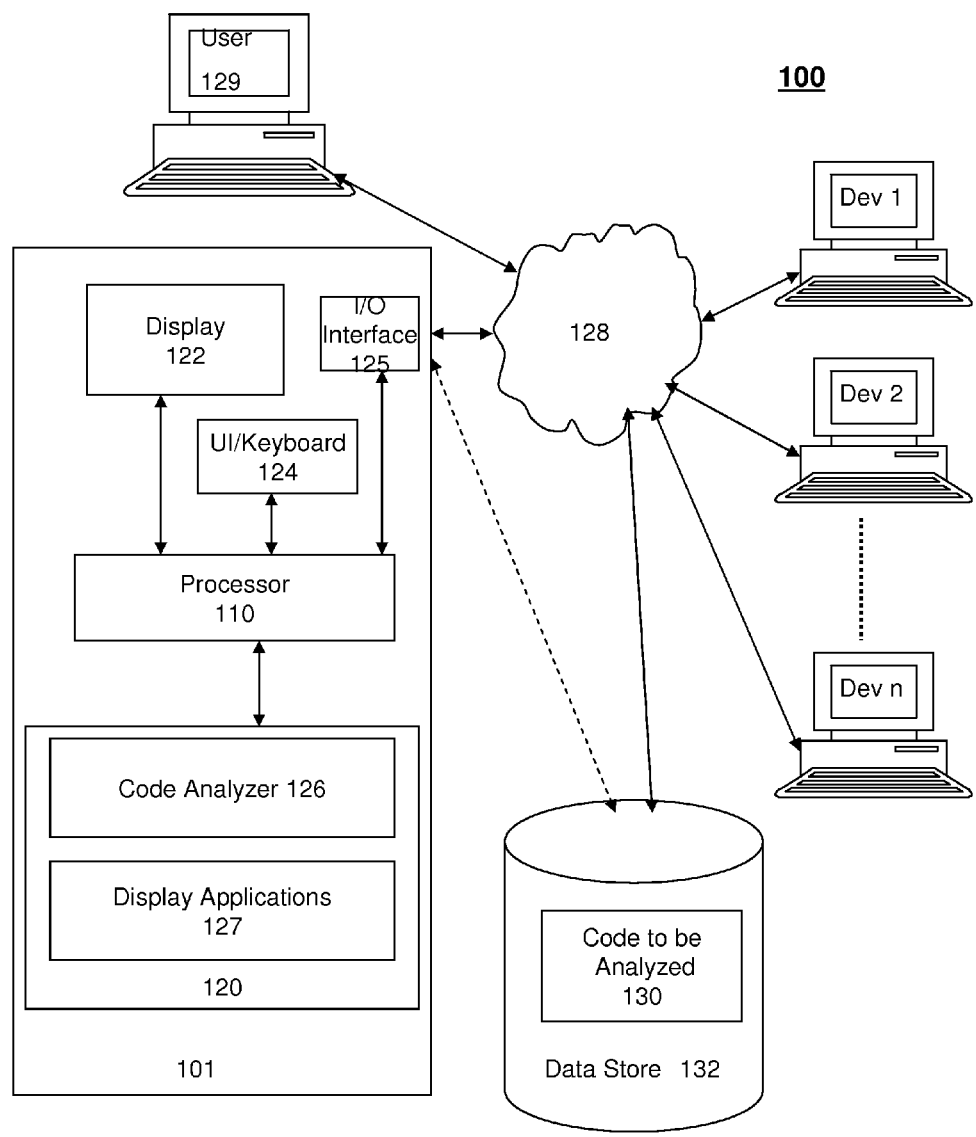
FIG. 1 is a block diagram of a computer system architecture according to an embodiment of the subject invention.

The following definitions are used in this specification, others will be defined as and when they occur.

Procedure: In the field of computer programming languages and software, a software procedure refers to a series of related instructions or statements to be executed by a processor to perform a specific function or task. A procedure is a sequence of instructions that can be 'called' (executed) by a processor a number of different times and from a number of different places during the execution of a software program. Often, one procedure will call another procedure and, in turn, these procedures will call others, and so on. Most computer languages allow arguments (parameters) to be passed to a procedure at the time it is called, and one or perhaps more return values to be passed back when at the time the execution of the procedure is complete.

Bug: A software 'bug' is a term used to describe an error or defect in a software program that causes it to execute incorrectly. Bugs in software programs are common. The process finding and fixing bugs, by looking at program code or testing programs to ensure they are operating correctly, is called 'bug catching'.

Spec: An automatic program verification (APV) tool analyzes blocks of program code, such as procedures, to check if they are free of certain types of bugs. In analyzing a procedure, an APV may sometimes identify bugs in the code. Other times, the APV tool may determine a procedure is free of some types of bugs. To show the absence of bugs, the APV tool tries to construct a correctness proof for the procedure. If the proof process succeeds, the APV tool generates what are pre- and post-conditions for the procedure. Pre- and post-conditions refer to statements or assumptions about what is true before and after a procedure is called. Specifically, pre-conditions refer to what conditions hold at the time a procedure is called, post-conditions refer what holds at the time a procedure completes. This can be summarized by saying:

if (the pre-condition is true) then (no memory-related errors occur and at least one post-condition is true)

In this context, a specification (or 'spec') for a procedure is a correctness proof which maps a pre-condition to one or more post-conditions. 'Spec Coverage' refers to a measure or metric of how many of the possible execution paths through a procedures are covered by specs. An exemplary commercially available APV tool is Infer™ available from Monoidics Ltd.

Call Graph: A call graph is a directed graph representing the calling relationships between the collections of procedures in a computer program. Specifically, in this graph, each node represents a procedure p and each edge (p, q) in the graph indicates a call from procedure p to procedure q.

Traditionally methodologies developed for the analysis of software systems can be classified in two major categories: (formal) verification and testing. Formal verification is a mathematical-based analysis which establishes whether software P conforms to a given specification S written in some formal language (e.g, Hoare logic or temporal logic). The analysis is done by constructing a mathematical proof that the software P satisfies the specification S: that is all the possible run time behaviors of P conform to the behaviors allowed by the specification S. If no proofs can be found, then nothing can be concluded about how P conforms or does not conform to S. Hence, formal verification typically can only provide a rudimentary yes/no metric.

Testing techniques, which include dynamic analysis and some kinds of static analyses, analyze software in search of failures in the software to conform to a specification. Testing can provide evidence of violation to conformance and, therefore, it gives metrics for non-conformance, such as the number of violations in P with respect to the specification S. However, when no violations are found nothing can be concluded about the conformance of P to S. Testing only checks a finite set of runtime behaviors, and therefore, although the tested behaviors may conform to the specification, this does not provide enough evidence to conclude that in general P conforms to S, in fact, there might still be untested run time behaviors of P which may violate S.

The present matter describes a method and tool for measuring conformance quantitatively, which is based on formal verification, yet goes beyond the yes/no ability of traditional formal analysis.

The present method has the following characteristics: 1) it is algorithmic, and so can be executed on a processor and results can be generated automatically; 2) it is mathematically well-founded; 3) the results can be generated and displayed; that is, they can be effectively communicated by graphical means; 4) it can be applied to large scale software projects that are too cumbersome and impractical for analysis by an individual.

In very general terms the method is commenced by inputting results of a mathematical analysis of the software based on formal verification. These results are used to compute metrics of the source code. Three metrics are exemplified and determined as follows. First, a metric of conformance of the software with respect to a specification describing positive features of the run-time behaviors of the code (e.g., no-crashes). We call this positive metric spec coverage (SC) as defined earlier. Secondly, a metric which quantifies the violation of the run-time behaviors with respect to the specification which we call defect density (DD) i.e. a negative measure of the quality of the code. Thirdly, a metric, called call rank (CR) which quantifies the importance of software components (e.g., a procedure of a file). Spec coverage, defect density and call rank are then combined together in several ways to display the current quality of the software and to help identify which parts of the system should be fixed first d if a goal is to improve the quality of the entire project. An aspect of the metrics is that, although they relate to the possible run-time behaviors of the software, they are computed at compile time by means astatic code analysis. Therefore the present methods can be used to assess the robustness of a software project throughout its development and it can provide guidance for improving the overall quality. In summary the present system and method combine previous measures to give a snapshot of the quality of the system (a quality map).

Referring to FIG. 1 there is shown a diagram illustrating a system architecture 100, according to an embodiment of the present invention. By way of illustration, the system 100 depicted in FIG. 1 includes a client computer 101 having a client processor and for a server processor 110 coupled to a memory 120, a display 122, a user input 124 and communications interface 125. The system architecture may be distributed and a code analyzer 126 according to an embodiment of the present matter is stored in the memory 120 for execution by the processor 110 and code to be analyzed 130 is for example stored on a data store 132, such as a local disk drive, network drive, server, website, remote computer etc. The results of the analyzed code may be processed by a display application 127 executed by the processor for presentation in one or more forms such as on the display 122, printed, saved to a file or memory etc. The code analyzer and display application may be Web based and accessed via the Web 128 and executed by a user computer 129 using a Web browser interface. Typically the code to be analyzed 130 may be portion of a software project or the entire software project. The software project is usually contributed to by a number of software developers Dev 1 . . . Dev n working collaboratively from different geographic locations.

Figure 8:
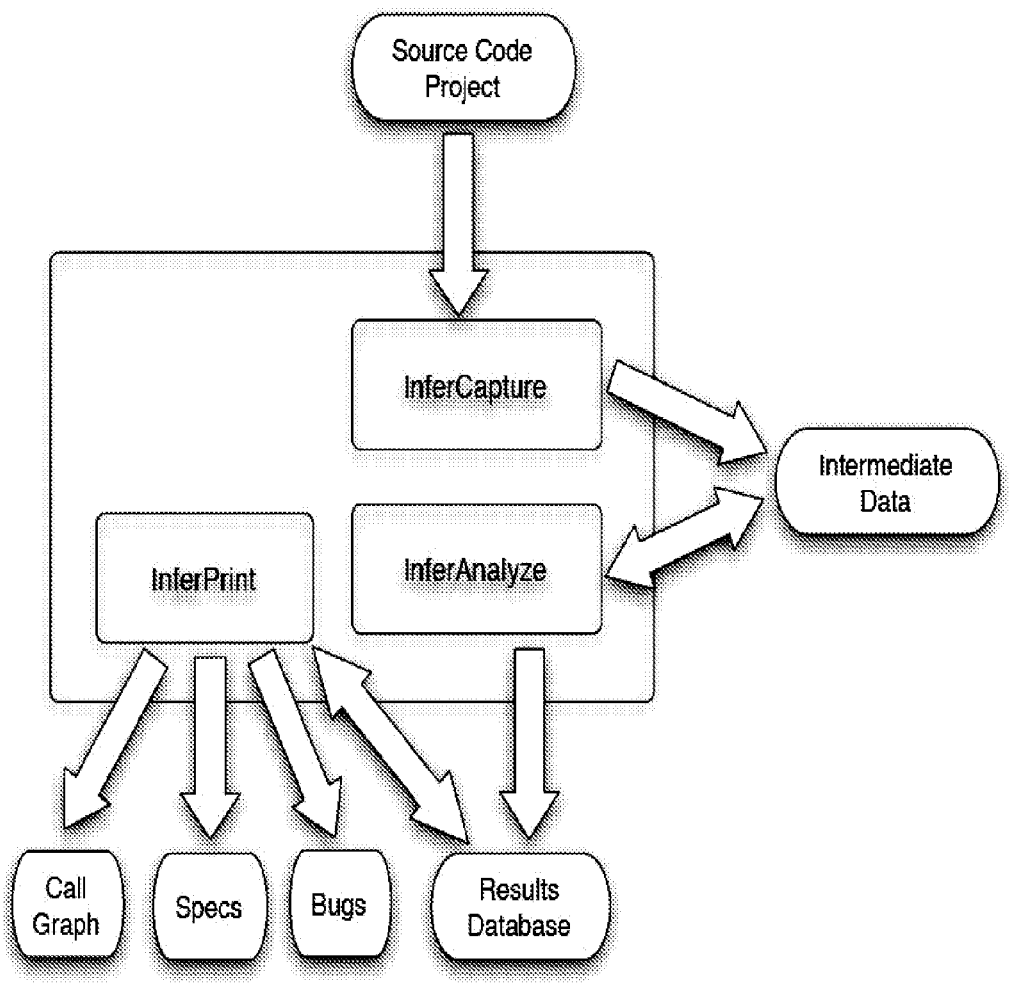
FIG. 8 is a block diagram illustrating architecture of a tool for automatic program verification.

As mentioned earlier a known commercial tool for automatic program verification is called Infer™ by Monoidics Ltd. for verification of memory safety of, for example, C code. A block diagram of its components is shown in FIG. 8. This APV tool is based on the theory of Separation Logic and includes several advances in proof automation and proof synthesis. Infer's™ main features include: Deep-heap analysis (a.k.a. shape analysis) in the presence of dynamic memory allocation. Infer's™ analysis engine can precisely reason about a variety of complex dynamic allocated data structures such as singly and doubly and nested linked lists; It is sound with respect to the underlying model of separation logic. Infer synthesizes sound procedure specifications which imply memory safety with respect to that model; it is scalable. Infer™ implements a compositional interprocedural analysis and has been applied to several large software projects containing up to several millions of lines of code (e.g. the Linux kernel); It is completely automatic: the user is not required to add any annotations or modify the original source code; It can analyze incomplete code. Infer™ can be applied to a piece of code in isolation, independently from the context where the code will be used.

An APV tool, when run, attempts to build a proof of memory safety of the program. Rarely is a software project entirely safe and, consequently, a proof can be actually built. However, the results of the proof attempt performed by Infer™ constitute an information goldmine on the safety of parts of the entire project (e.g., proofs for certain procedures or the discovery of bugs for others). The question then arises of how to mine and interpret this host of information.

The present matter describes a method and system for extracting, classifying, post-processing, and displaying the results of verification tools such as Infer™ or any other suitable APV tool, and interprets them in relation to the quality of the software analyzed.

As mentioned above the present method for displaying software quality is based on the combination of three kinds of objective software metrics: evidence metrics, counter-evidence metrics, and importance metrics. The interaction of these three metrics may be pictured with a graphical representation—called quality map—which is used to display the health status of a software system made up of individual components, in analogy with what an x-ray does for the tissues in an organism. This analogy also illustrates why a single metric is not sufficient to support quality assurance, even one constructed by the combination of objective metrics. For example, an ordered list of the most damaged tissue components would be a poor basis to decide on whether and where to operate. The advantage of a graphical representation of software quality is that it allows different users to examine different aspects of the software, and focus on what matters for them at the time to make changes and their effect in the context of the overall software project. Other non graphical representation of the display may also be used, such as an ordered list or table for example.

Figure 2:
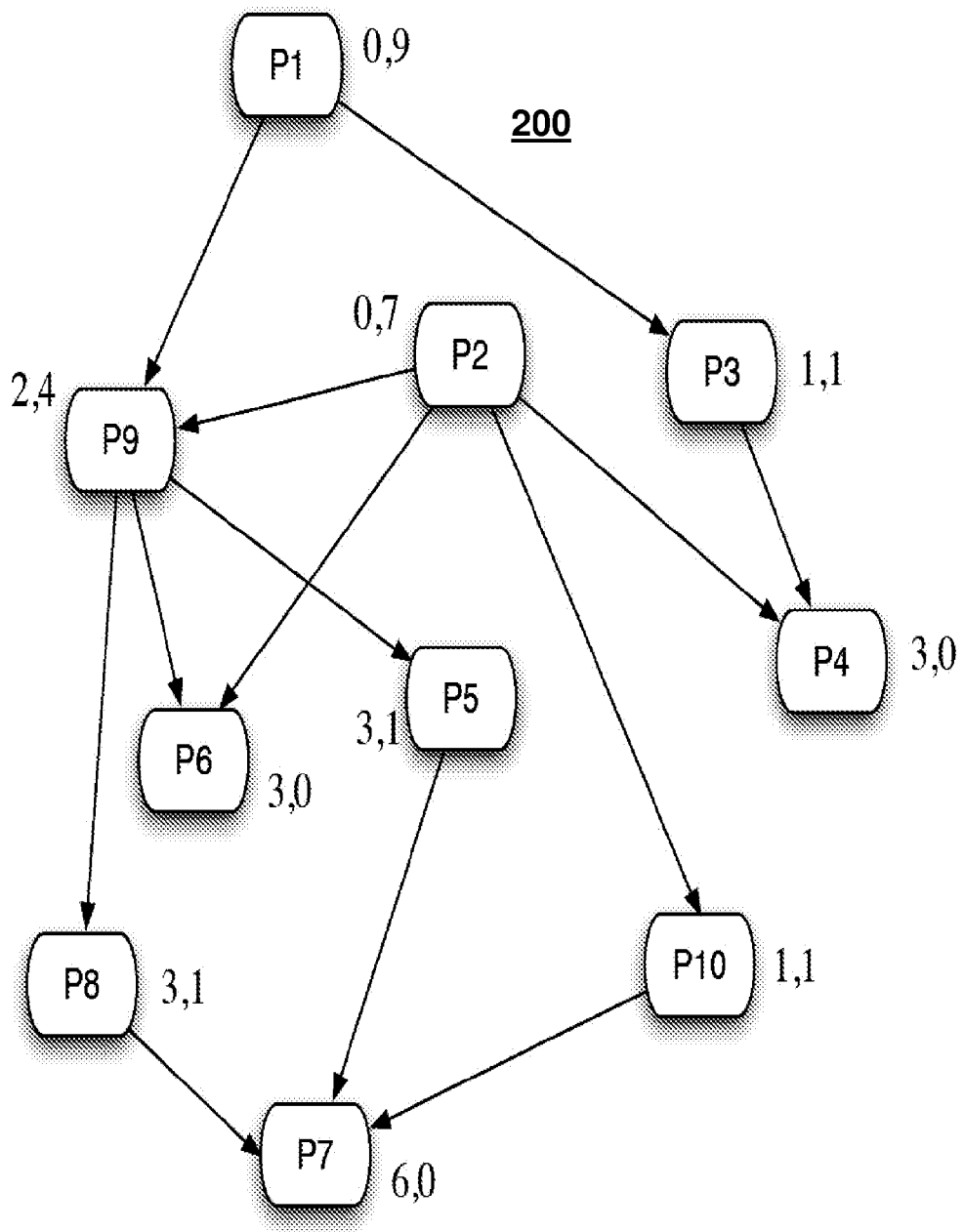
FIG. 2 is an exemplary call graph.

The need for the metrics may be better illustrated by referring to a call graph 200 of a software project illustrated in FIG. 2 where the software project is composed of a set of procedures {P1, . . . , P10} each accompanied by an ordered pair of numbers indicating for the procedure Pi the number of in-calls and out-calls. Assume that procedures P7 and P3 contain a bug, for example a memory leak. Further assume that there is a restriction present whereby one or the other of the memory leaks could be fixed but not both. The question then arises of which one should be fixed? Although it is the same type of defect in each case, a sensible goal is to fix the one that, in the larger picture, has a greater impact on the overall quality of the software project. The call graph shows that P7 is called by six (6) other procedures (taking into account the transitive closure of the call relation), whereas P3 is only called by one (1) other procedure. Intuitively, a developer working in a bottom-up fashion would want to fix the leak in P7 since having this procedure operate correctly is outwardly more central to the proper operation of the whole project. Another developer working in a top-down fashion might instead want to fix P3 first, since P3 calls one procedure while P7 calls none. The definition of call rank has parameters to specify the relative importance of in-calls and out-calls, to cater for a range of possible uses.

The metrics are further explained as below:

a) The evidence metric (EM) of software quality indicates how closely a component adheres to its specification. This is a measure of conformance to an objective property, which could be established by a variety of means. Examples of properties include that a program will not have memory errors when executed, or that every file opened will eventually be closed. Various means of supporting an evidence metric are possible in principle, from the automatic execution of a software analysis tool to manual inspection and certification. An example of a method to compute an EM is called Spec Coverage (SC), whereby a program is executed to automatically inspect the source code of the component and determine what portions of the component can be proven to be free from certain software defects.

b) The Counter-Evidence Metric is a measure of anecdotal evidence that a software component could operate outside the range of acceptable behaviors. Two factors distinguishing it from an Evidence Metric are: that it indicates deviation from normal operation; and that it provides no guarantee that the component can behave incorrectly. Since no guarantee is needed, a metric of this kind is simpler and cheaper to implement, but the results tend to be less trustworthy. A method to compute a Counter-Evidence Metric called Defect Density (DD), is described whereby an automatic program is used to inspect the source code of the component and find potential violations of coding rules which may indicate the presence of certain software defects.

c) The Importance Metric measures the importance or relevance of a software component. Such a metric is based on some simple measure of size of a component, such as the number of lines of source code, or the size of its representation in an abstract model. However, a metric based on the relationship between components, taking into account their behavior and dependencies may be better. Here we describe an automatic method to compute an Importance Metric called Call Rank (CR) as one example only, whereby the importance is determined after source code is analyzed by a combination of the dominance of the procedures in the call graph, and a measure of conformance of calls between them.

Figure 3:
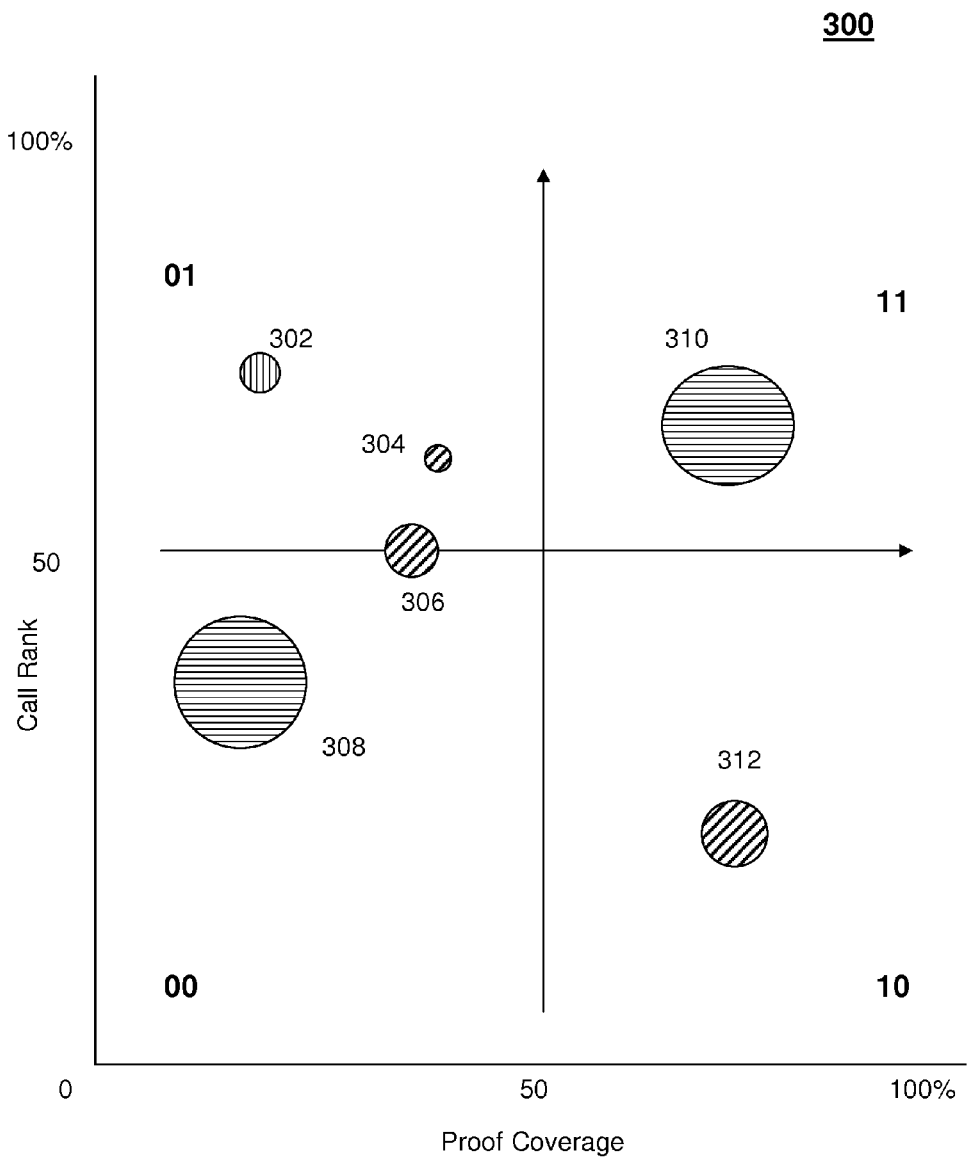
FIG. 3 is an exemplary quality map where size and pattern of circles are proportional to a number of lines of code and defect density determined according to an embodiment of the present invention.

Referring to FIG. 3 there is shown a 2-dimensional graphical display of a quality map generated as an output from a tool for processing results from a static code analysis module using the three metrics to obtain a display of the quality map according to an embodiment of the present matter. The display application 127 combines the three metrics in several different ways to obtain and display the quality maps for the software code 130 being analyzed. The metrics may provide a mapping of components into a 3-dimensional space or a 2-dimensional picture or map may be generated by assigning two of the metrics to an X and Y axes respectively, and using the third metric to determine the displayed appearance of components, for example colour or pattern as specifically illustrated in FIG. 3.

There are three kinds of Quality Maps each corresponding to the metric used on the X and Y axis respectively i.e. SC-CR, SC-DD, and DD-CR. FIG. 3 there is shown one embodiment of a SC-CR Quality Map 300, where the X axis is Proof Coverage, the Y axis is the Call Rank. Each of the axes represents a scale in a range of 0 to 100%. Each component (typically a procedure) in the software project is represented by a circle where a size (radius) of a circle and pattern (or color) is determined by the number of lines of code in the component and defect density respectively. In the illustrated example the quality map 200 of the software project comprises six components, therefore six circles 302, 304, 306, 308, 310, 312 are represented.

The map 300 may be used to quickly identify the components of critical importance for quality assurance in the software project. The map is divided into four quadrants labeled 11, 10, 00, 01, clockwise starting from top right:

i. Quadrant 11 contains components with high SC and high CR. These components are the quality champions of the project.
ii. Quadrant 10 contains components with high SC and low CR. These components are of secondary importance.
iii. Quadrant 00 contains components with low SC and low CR. These components are in need of improvement, but their importance is limited.
iv. Quadrant 01 contains components with low SC and high CR. These components are where the effort should be concentrated in order to improve the overall quality of a project.

For a SC-DD Quality Map (not shown), the four quadrants classify components in the following way:

i. Quadrant 11 contains components with high SC and high DD. These components contain bugs affecting only few execution paths.
ii. Quadrant 10 contains components with high SC and low DD. These components are of good quality.
iii. Quadrant 00 contains components with low SC and low DD. These are components of which not much is known.
iv. Quadrant 01 contains components with low SC and high DD. These components are of poor quality.

A DD-CR Quality Map (not shown) is similar to a SC-CR Quality Map, without the guarantees of Proof Coverage.

One of the technical advantages of the present matter is that as a software project evolves over time, the values of the metrics for its components evolve too and may be displayed as a sequence of quality maps in time which displays the dynamic unfolding of the metrics at each point in time. This quality evolution can be displayed in a dynamic way as a movie.

Figure 4:
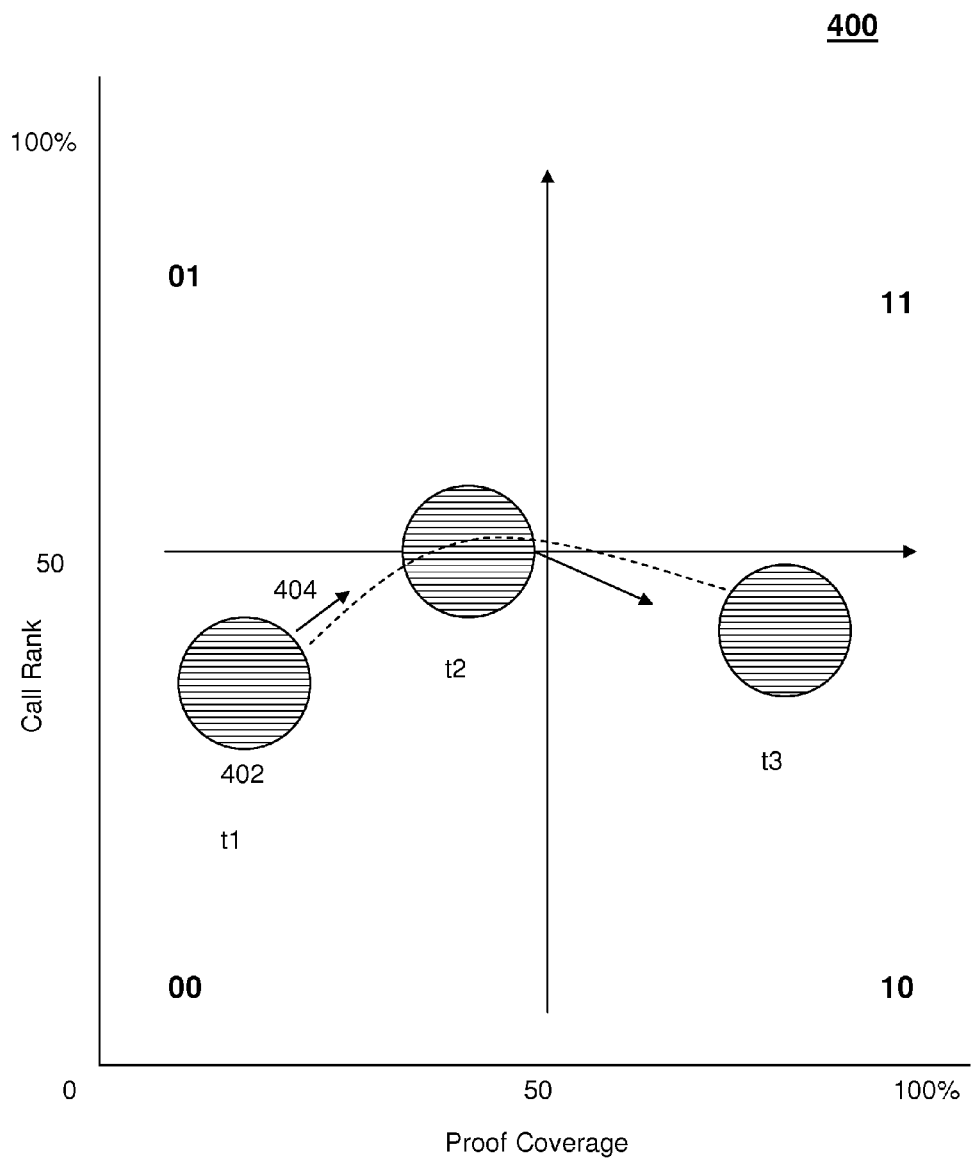
FIG. 4 is an exemplary quality map illustrating quality evolution according to an embodiment of the present invention.

Alternatively, a static display method for quality evolution is illustrated in FIG. 4 for a single component 402. The display comprises a 2-dimensional map, where a displayed aspect of each component contains a clue for the evolution trend of that component, such as an arrow 404 of a given length, whose direction indicates where the component is moving in terms of quality and the length indicates the velocity or rate at which the quality is changing as for example illustrated in FIG. 4 which shows that component at different times t1, t2 and t3. This can be a useful tool to a software project manager.

While the above provides a general description of the utility of quality maps, below is a technical description of the three metrics for producing software quality maps. We first give a description using procedures as basic software components. The description is then extended to different kinds of components (such as files or modules).

For ease of description, the following C language code fragment for a procedure testV1 ( ) is used to illustrate spec coverage:

```
1  void testV1(int flag) {
2      int *x = NULL;
3      if(flag) {
4          x = malloc(sizeof(int));
5          // V2: if(!x) return;
6          *x = 3;
7          foo(x);
8          *x = 2;
9          foo(x); }
10     *x = 0; // V3: if(x) *x = 0;
11     free(x); }
```

The Spec Coverage SC(p) of a procedure p, which exemplifies the EM, is a value in the range [0; 1], indicating the proportion of the procedure which is known to adhere to its specification. In other words spec coverage quantifies certain ways of multiple ways of execution of a component which are error free. This does not depend on a specific way of computing Spec Coverage. The Spec Coverage SC(F) of a file F={p1; : : : ; pn} consisting of procedures p1 to pn is computed as follows:

$$SC(F) = \frac{\sum_{i=1\ldots n} W(p_i) * SC(p_i)}{\sum_{i=1\ldots n} W(p_i)}$$

where W(pi) is the Weight of procedure pi. The Weight is a measure of the size of a procedure with respect to some concern. One example of weight is the number of lines of code in the implementation of the procedure, or the number of nodes in its control flow graph, or some other relevant measure attributable to the procedure in isolation.

For example, consider procedure testV1( ) above. It contains two memory errors i.e. if flag is true, then we have a possible NULL pointer dereference on line 5 in case malloc fails to allocate memory. If instead flag is false, we have a NULL pointer dereference on line 10. Internally, the control flow graph consists of 16 nodes, but because of the memory errors, no spec can be found, so the spec coverage is 0. Suppose that for some reason, only one of the bugs can be fixed: by either enabling the line marked with V2 or the line marked with V3. In the first case, precondition flag!=0 is found with spec coverage 0.95 (only one node is not covered, indicating the false part of the conditional), and in the second case precondition flag==0 is found with spec coverage 0.47 (the entire true branch of the conditional is not covered).

Next, assume a known method to compute a function Defects(p; t), for example compilation errors, returns a set of defects of type t for each procedure p. An example t of defect is a memory leak, where memory allocated during the execution of a procedure is never reclaimed. The method is independent from how the set of defects is computed. Several manual and automatic methods exist to find candidate defects in software. The Defect Density DD(F; t) of a file F={p1; : : : ; pn} is computed as follows:

$$DD(F, t) = \frac{\sum_{i=1\ldots n} W(p_i) * \#\text{Defects}(p_i, t)}{\sum_{i=1\ldots n} W(p_i)}$$

where # denotes the cardinality of a set, and where W(pi) is the Weight of procedure pi.

The Call Rank CR(p) of a procedure p indicates the importance of p in relation to other procedures. The importance is computed by combining the dominance of p in the call graph and the success rate of calls to p. The dominance of a procedure p is computed from the call graph: a set P of procedures, and a set E ⊆ P×P of call edges. An edge (p1, p2)∈E indicates that procedure p1 may call procedure p2. Notation p1→p2 indicates (p1, p2)∈E, and →* denotes the reflexive and transitive closure of →. The formal definition of Dominance Dom(p, c1, c2) is $$\text{InCalls}(p) = \{p' \neq p | p' \to^* p\}$$

$$\text{OutCalls}(p) = \{p' \neq p | p \to^* p'\}$$

$$\text{Dom}(p, c_1, c_2) = c_1 * \#\text{InCalls}(p) + c_2 * \#\text{OutCalls}(p)$$

where # denotes the cardinality of a set, and the constant c1 (resp. c2) specifies the relative importance of the procedures calling (resp. being called by) the procedure in question.

The success rate Succ(p1; p2) of a call from procedure p1 to procedure p2 is a number in the range [0; 1]. It is computed during analysis of the source code as the ratio of successful calls from p1 to p2, where a call is successful when it establishes the requirements in p2's specification. For example, if p1 has one parameter x and the requirements in p2's specification are that x be negative, three calls with values 0; 1; −1 will give a success rate Succ(p1; p2)=0:3.

The Call Rank CR(p, c1, c2) of procedure p is then computed as follows $$CR(p, c_1, c_2) = \sum_{\{p' | p' \to p\}} \frac{\text{Dom}(p', c_1, c_2)}{\text{Succ}(p', p)}$$

where the importance of the caller Dom(p', c1, c2) is positively correlated and the success rate Succ(p', p) is negatively correlated. The rationale is that a higher call rank will be assigned to p when it is called by important procedures with low success rate, because this means that p could have a high impact on the overall quality of the project. The Call Rank CR(F, c1, c2) for file F is then computed as follows:

$$CR(F, c_1, c_2) = \sum_{\{p' \notin F | p' \to F\}} \frac{Dom(p', c_1, c_2)}{Succ(p', p)}$$

Figure 5:
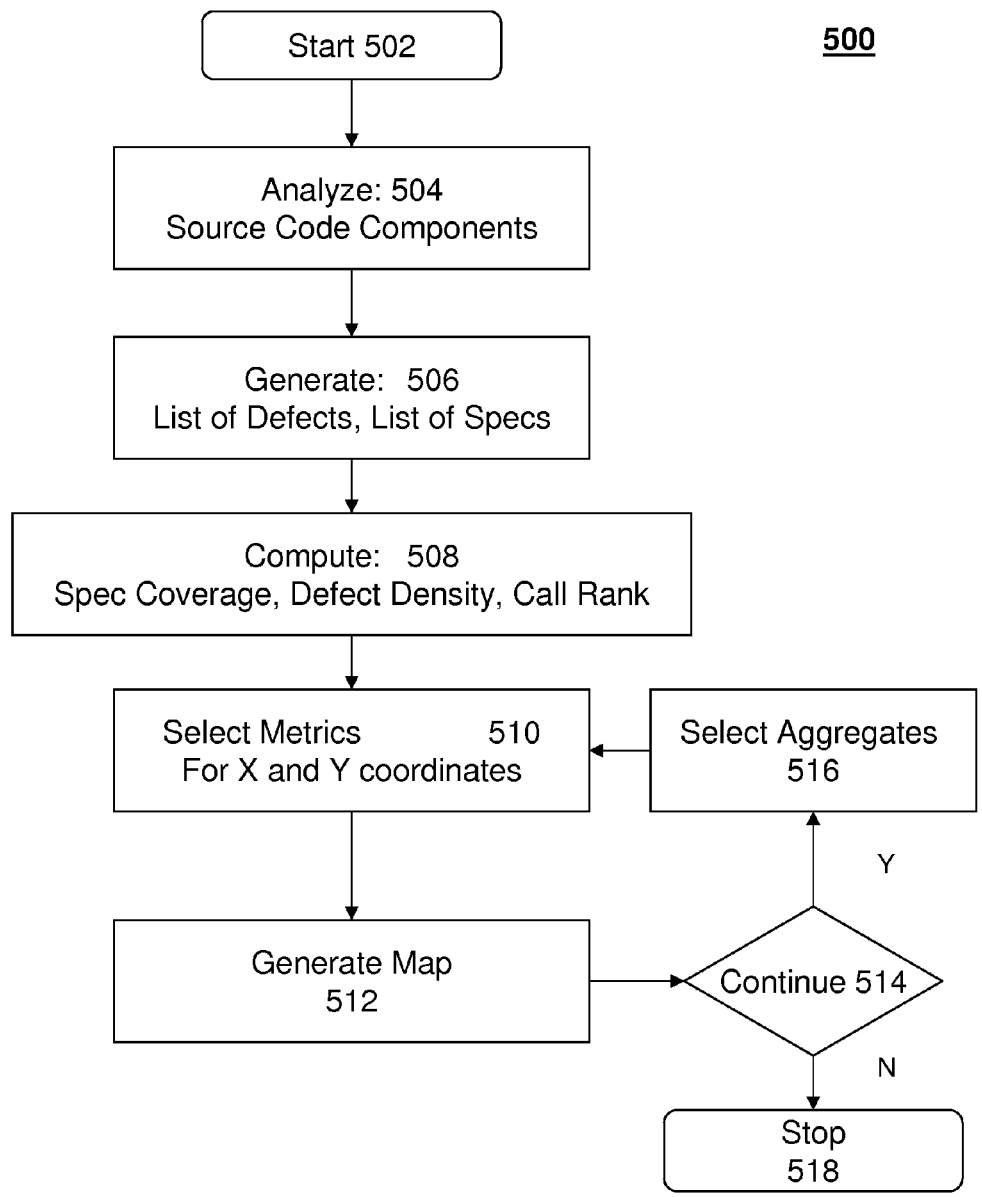
FIG. 5 is a flow chart of a method according to an embodiment of the present invention.

Referring now to FIG. 5B, there is shown a flow chart 500 of a generalized method according to an embodiment of the subject invention. In general the method 500 starts with execution of an analysis tool using for example a code analyzer 126 to analyze source code components of a target file or procedure 130 stored in memory 132, generating 506 a list of defects and a list of specs (where as defined earlier a specification for a procedure is a correctness proof which maps a pre-condition to one or more post conditions); computing 508, using the output of step 506, the values of spec coverage, defect density and call rank, using the values from step 508 for the selected metrics(SC-CR, SC-DD, and DD-CR) to generate the X and Y coordinates for the step of displaying (generating) 512 the quality map an example of which is exemplified in FIG. 3.

A software project may contain many files or procedures so that its quality map is crowded with many overlapping bubbles and colors. The ability to generate individual images by directory can help, but often a quality map of the whole project is still desired. In these cases, the ability to aggregate data can also be helpful. One method for aggregating data is based on quad-trees. Here 'quad' refers to 'quadrant'. Any square grid has the property that it can be divided into 4 equal quadrants. Of course, each quadrant itself is also square, so each can be further divided into 4 equal areas. With quad-tree aggregation, all of the bubbles falling within a quadrant are averaged together and displayed as a single bubble. As an example aggregations include: the files grouped by the directory they belong to, the files or procedures grouped by author, or by modification week, or by product in a software product line. Formally, an aggregate $A=\{a1, \ldots, an\}$ consists of a collection of measurable entities a1 to an, where a measurable entity is any entity on which the metrics SC, DD, CR and W can be defined. For example, files and procedures are measurable entities. The notions of Weight, Spec Coverage, Defect Density, and Call Rank extend to aggregates in the following way $$W(A) = \sum_{i=1\ldots n} W(a_i)$$

$$SC(A) = \frac{\sum_{i=1\ldots n} W(a_i) * SC(a_i)}{W(A)}$$

$$DD(A, t) = \frac{\sum_{i=1\ldots n} W(a_i) * DD(a_i, t)}{W(A)}$$

$$CR(A, c_1, c_2) = \frac{\sum_{i=1\ldots n} W(a_i) * CR(a_i, t)}{W(A)}$$

The resulting aggregates with the measures defined in this way are themselves measurable entities, and can be further aggregated.

It has been shown earlier how two metrics can be used to define the X and Y axes on the plane, and the third one to determine the displayed appearance. The division into four quadrants labeled 01, 11, 10, and 00 can be used to form a basic aggregation, where measurable entities are grouped by quadrant. In other words, this construction produces up to four aggregates, one for each quadrant containing at least one entity. More generally, let n be the desired nesting level. The first four quadrants are at nesting level 1. Each non-empty quadrant at nesting level k can then be further subdivided into up to four sub-quadrants at nesting level k+1. This subdivision proceeds until the desired nesting level n has been reached. This quad tree (here "quad: refers to a "quadrant") aggregation algorithm produces up to $2^n$ aggregates. For example, let n be 2, and let quadrant 10 be the only non-empty one. A further subdivision produces four sub quadrants labeled 10:00, 10:01, 10:10 and 10:11.

The generalized method of exemplified earlier may be better understood by referring to an example calculation of metrics. For this example consider the C language code fragment below with three procedures.

```
01 void P1(int *x) {
02 printf("in P1\n");
03 }
04
05 void P2(int *x) {
06     printf("in P2\n");
07     }
08
09 void P3(int flag) {
10     int *x = NULL;
11     if(flag) {
12         x = malloc(sizeof(int));
13         if(!x) return;
14         *x = 3;
15         P1(x);
16         *x = 2;
17         P2(x);
18     }
19     *x = 0; // Bug: NULL pointer dereference
20     free(x);
21 }
```

Figure 6:
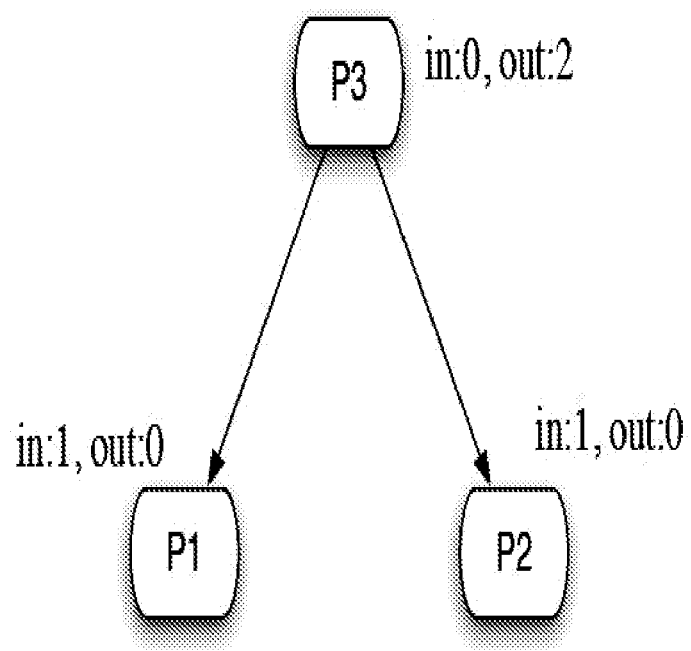
FIG. 6 is another exemplary call graph.

The call graph 600 for procedures P1, P2, and P3 is shown in FIG. 6.

Figure 7:
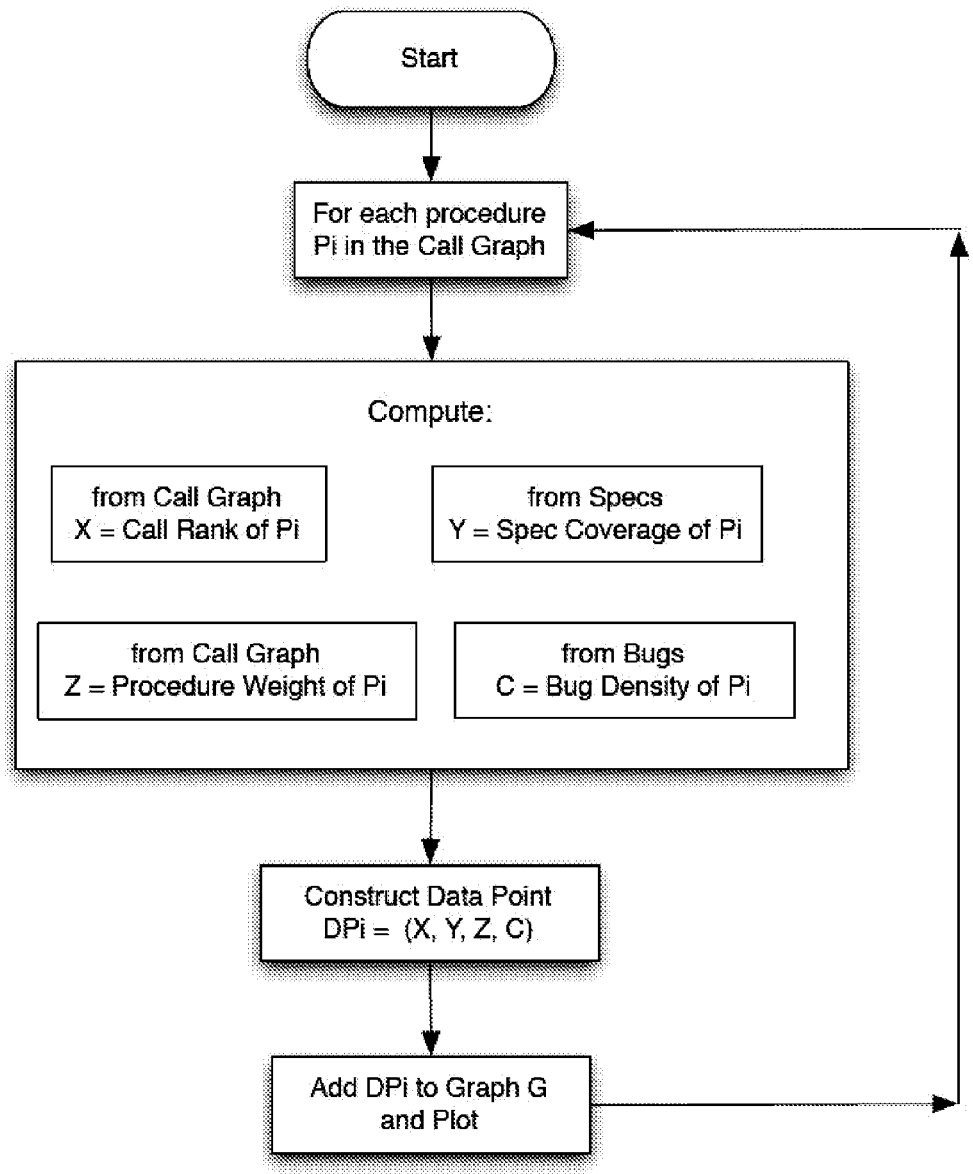
FIG. 7 is another flow chart of a method according to an embodiment of the present invention.

Referring to FIG. 7 there is shown a flow chart 700 for calculating the metrics discussed earlier. For each procedure Pi in the call graph 600, the call rank is calculated as follows: The number of incoming calls is indicated as in: . . . and the number of outgoing calls as out: . . . . The Call Rank is computed as the sum of incoming and outgoing calls, so the calculation is X1=1+0 and X2=1+0 and X3=0+2.

For calculating spec coverage, consider procedure P3. The code contains one memory error at line 19. The automatic analysis enumerates two cases when analyzing the conditional on line 11:

Case flag!=0: no bug is encountered, and one proof is found.

Case flag==0: one NULL pointer dereference bug is found on line 19.

If the INFER™ program is used it finds one spec with precondition flag!=0. Internally, the control flow graph consists of 21 nodes, and the condition flag!=0 excludes exactly one node: the node on line 11 corresponding to the false part of the conditional. The computed Spec Coverage is 0.95, corresponding to 20 nodes out of 21. In case of P1 and P2, the control flow graph consists of 5 nodes, there are no bugs, and the Spec Coverage is 1.0. The calculation is Y1=5/5 and Y2=5/5 and Y3=20/21

Calculating procedure weight is simply the number of nodes in the control flow graph. The calculation is Z1=5 and Z2=5 and Z3=21.

The Bug Density is computed as the number of bugs divided by the Procedure Weight. The calculation is C1=0/5 and C2=0/5 and C3=1/21.

Results of calculations:

| X1 = 1 | Y1 = 1.0  | Z1 = 5  | C1 = 0:0   |
| X2 = 1 | Y2 = 1.0  | Z2 = 5  | C2 = 0:0   |
| X3 = 2 | Y3 = 0.95 | Z3 = 21 | C3 = 0.05. |

These results may then be plotted (not shown) as a quality map for each data point DPi=(X, Y, Z, C) corresponding to each procedure Pi similar to that as exemplified in FIG. 3 described earlier.

As will be appreciated the methods described herein may be embodied on a computer readable medium.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method performed by a computing system, comprising:
    receiving, by a code analyzer, program code, wherein the received program code has no annotations;
    generating, by the code analyzer, a list of defects in the program code based on an analysis of the program code without requiring modification of the program code;
    generating a list of specifications for the program code;
    computing, using the generated list of defects and the generated list of specifications, values for one or more of a specification coverage, a defect density, or a call rank for the received program code;
    generating, based on one or more of the specification coverage, the defect density, or the call rank, a quality map for the received program code to provide a visual indication of quality of the received program code;
    generating a set of aggregates for procedures in the program code, each aggregate of the set of aggregates being a collection of procedures grouped based on a factor, the factor including any of author, modification week, or product;
    generating, for each aggregate of the set of aggregates, one or more of an aggregated specification coverage, an aggregated defect density, or an aggregated call rank for the collection of procedures in the aggregate; and
    generating, based on the one or more of the aggregated specification coverage, the aggregated defect density, or the aggregated call rank, an updated quality map for the set of aggregates, the updated quality map including four quadrants, each quadrant corresponding to two quality metrics selected from any of the aggregated specification coverage, the aggregated defect density, or the aggregated call rank.

2. The method of claim 1, wherein the program code is source code.

3. The method of claim 1, wherein the program code is object code.

4. The method of claim 1, wherein a defect in the generated list of defects is an unintended consequence of executing the received program code.

5. The method of claim 1, wherein a specification in the list of specifications specifies a pre-condition for a procedure in the received program code.

6. The method of claim 1, wherein a specification in the list of specifications specifies a post-condition for a procedure in the received program code.

7. The method of claim 1, wherein computing the specification coverage includes computing, for a procedure in the received program code, a count of possible execution paths covered by the generated list of specifications.

8. The method of claim 1, wherein computing the specification coverage includes computing $$SC(F) = \frac{\sum_{i=1...n} W(p_i) * SC(p_i)}{\sum_{i=1...n} W(p_i)}$$

wherein SC(F) is the specification coverage for a program code file F, wherein the program code file F comprises procedures $p_1$ to $p_n$, wherein SC($p_i$) is the specification coverage of a procedure $p_i$, and wherein W($p_i$) is a measure of a size of a procedure $p_i$.

9. The method of claim 8, wherein the size is a number of lines of program code.

10. The method of claim 8, wherein the size is a count of a number of nodes of a control flow graph generated for the procedure $p_i$.

11. The method of claim 1, wherein computing the defect density includes computing, for a procedure in the received program code, a count of runtime violations of the generated list of specifications.

12. The method of claim 1, wherein computing the defect density includes computing $$DD(F, t) = \frac{\sum_{i=1...n} W(p_i) * \#Defects(p_i, t)}{\sum_{i=1...n} W(p_i)}$$

wherein DD(F,t) is the defect density for a program code file F, wherein t specifies a type of defect, wherein the program code file F comprises procedures $p_1$ to $p_n$, wherein #Defects ($p_i$, t) is a cardinality of a set of defects of type t for the procedure $p_i$, and wherein W($p_i$) is a measure of a size of a procedure $p_i$.

13. The method of claim 1, wherein computing the call rank for the received program code includes computing an importance metric for the received program code.

14. The method of claim 13, wherein a first procedure in the received program code is more important than a second procedure in the received program code if the first procedure is invoked more often than the second procedure.

15. The method of claim 13, further comprising computing the importance metric by computing a dominance of procedures in a call graph and a conformance of calls between the procedures.

16. The method of claim 1, wherein the quality map is generated based on the specification coverage and the defect density, wherein a high quality first metric is a high specification coverage and a low quality first metric is a low specification coverage, and wherein a high quality second metric is a high defect density and a low quality second metric is a low defect density.

17. The method of claim 1, wherein the quality map is generated based on the specification coverage and the call rank, wherein a high quality first metric is a high specification coverage and a low quality first metric is a low specification coverage, and wherein a high quality second metric is a high call rank and a low quality second metric is a low call rank.

18. The method of claim 1, wherein the quality map is generated based on the defect density and the call rank, wherein a high quality first metric is a high defect density and a low quality first metric is a low defect density, and wherein a high quality second metric is a high call rank and a low quality second metric is a low call rank.

19. One or more memories having stored thereon computer-executable instructions, comprising:
    instructions for receiving, by a code analyzer, program code, wherein the received program code has no annotations;
    instructions for generating a list of defects in the program code based on an analysis of the program code without requiring modification of the program code;
    instructions for generating a list of specifications for the program code;
    instructions for computing, using the generated list of defects and the generated list of specifications, values for one or more of a specification coverage, a defect density, or a call rank for the received program code;
    instructions for generating a quality map for the received program code, to provide a visual indication of quality of the received program code;
    instructions for generating a set of aggregates for procedures in the program code, each aggregate of the set of aggregates being a collection of procedures grouped based on a factor, the factor including any of author, modification week, or product;
    instructions for generating, for each aggregate of the set of aggregates, one or more of an aggregated specification coverage, an aggregated defect density, or an aggregated call rank for the collection of procedures in the aggregate; and
    instructions for generating, based on the one or more of the aggregated specification coverage, the aggregated defect density, or the aggregated call rank, an updated quality map for the set of aggregates, the updated quality map including four quadrants, each quadrant corresponding to two quality metrics selected from any of the aggregated specification coverage, the aggregated defect density, or the aggregated call rank.

20. The one or more memories of claim 19, wherein the program code is source code.

* * * * *